United States Patent
Carberry et al.

(10) Patent No.: US 7,192,197 B2
(45) Date of Patent: Mar. 20, 2007

(54) PLANETARY CLEANING MOTION OPTICAL CONNECTOR CLEANER

(75) Inventors: John Carberry, Talbott, TN (US);
Marcella Mirata, Livermore, CA (US);
Michael L. Smith, Jefferson City, TN (US); Lisa Carberry, Talbott, TN (US);
Susan Hubbard, Jefferson City, TN (US); Joe Ewing, Maryville, TN (US)

(73) Assignee: Neptec Optical Solutions, Inc., Fremont, CA (US)

( * ) Notice: Subject to any disclaimer, the term of this patent is extended or adjusted under 35 U.S.C. 154(b) by 0 days.

(21) Appl. No.: 10/950,920

(22) Filed: Sep. 27, 2004

(65) Prior Publication Data

US 2006/0067635 A1  Mar. 30, 2006

(51) Int. Cl.
*G02B 6/38* (2006.01)

(52) U.S. Cl. .............................. 385/75; 385/63; 385/65

(58) Field of Classification Search .................. 385/75, 385/63, 56
See application file for complete search history.

(56) References Cited

U.S. PATENT DOCUMENTS

| 5,117,528 | A | 6/1992 | Kanayama et al. |
| 5,463,709 | A | 10/1995 | Terao et al. |
| 5,559,916 | A | 9/1996 | Terao et al. |
| 6,560,811 | B1 * | 5/2003 | Krause et al. ............. 15/210.1 |
| 6,678,442 | B2 * | 1/2004 | Gall et al. ..................... 385/24 |
| 6,681,437 | B1 | 1/2004 | Miyake et al. |
| 2003/0039463 | A1 * | 2/2003 | Miyake ...................... 385/147 |
| 2003/0202752 | A1 * | 10/2003 | Gall et al. .................... 385/61 |
| 2004/0221525 | A1 * | 11/2004 | Hanna et al. .............. 52/204.5 |

* cited by examiner

*Primary Examiner*—Kaveh Kianni
(74) *Attorney, Agent, or Firm*—Pitts & Brittian, PC

(57) ABSTRACT

An optical connector cleaner. The optical connector cleaner includes a nonlinear path along which an optical connector is moved. By following the nonlinear path, the optical connector is subjected to planetary motion without requiring the operator to twist the connector by hand. The use of planetary motion improves the efficiency and quality of the cleaning operation. In addition, the optical connector cleaner of the present invention provides improved resistance to damage from the ferrule edge during cleaning.

6 Claims, 4 Drawing Sheets

PLANETARY CLEANING MOTION OPTICAL
CONNECTOR CLEANER

CROSS-REFERENCE TO RELATED
APPLICATIONS

Not Applicable.

STATEMENT REGARDING FEDERALLY
SPONSORED RESEARCH OR DEVELOPMENT

Not Applicable.

BACKGROUND OF THE INVENTION

1. Field of Invention

The invention relates to cleaners for optical connectors. More specifically, this invention relates to an optical connector cleaner that uses planetary cleaning motions.

2. Description of the Related Art

Connector cleaning has recently become recognized as an important issue by the Fiber Optic Telecommunications Industry. Major suppliers, operators, original equipment manufacturers (OEMs), and others have learned and recognized that a clean connector is critical to optimal and acceptable performance of optical components, subsystems, and systems. For example, the light-carrying core diameter of the most popular single mode optical fiber, the SMF-28e® by Corning Incorporated, is only 8 microns, meaning that any contamination at the core is likely to have a significant and potentially deadly effect on the light-carrying and light-conveying capacity of that connector.

Several major Original Equipment Manufacturers (OEM's) have recently determined that a very large portion of their customer complaints, field service calls, return of materials authorizations (RMAs), and repairs are traceable to contaminated connectors. Numerous anecdotal reports characterize contaminated connectors as uniformly responsible for between 30 and 40% of all RMAs and customer complaints. Considering that the industry standard Telcordia GR-2923-CORE ("Generic Requirements for Optical Fiber Cleaning Products"), as well as many other requirements and specifications referring to Telcordia GR-2923-CORE, require pre-installation connector cleaning, it becomes clear that a solution to this problem is required, valuable, and as yet unavailable. Traditional and currently available solutions are not adequate.

The perimeter of the 2.5 millimeter ferrule end face to be cleaned as used in the popular SC, FC, ST, and E-2000™ fiber optic connectors is about 8 millimeter, while the perimeter in the 1.25 millimeter ferrule end face used in the MU and LC fiber optic connectors is about 2 millimeter. For this reason, the edge in the small form factor 1.25 millimeter ferrule presents a much sharper edge imparting a much greater force per area. For instance, when cleaning a SFF connector, the 1.25 millimeter diameter connector used in the popular MU or LC connectors with traditional and currently available products, the SFF connector damages the cleaning sheet. Such damage causes additional contamination and, consequently, the SFF connector does not become uniformly clean as required. In the case of the large form factor connectors, the 2.5 millimeter diameter connector does not uniformly clean in one swipe. Additionally, these cleaners cannot clean the small and large form factor while also cleaning new industry standard connectors such as the multi-fiber connectors which are much larger in width. It is important to note that the general requirements for qualifying a connector cleaning product or process include proof of ability to clean: a) graphite powder; b) "Arizona Road Dust," an industry defined standard; c) lint; d) finger oil; e) liquid vegetable oils, such as Wesson® Oil; f) simethicone; g) water; h) alcohol; and i) salt water.

Thus it is desirable for an optical connector cleaning product to be able to clean both the 2.5 millimeter and 1.25 millimeter ferrule end faces without damaging the cleaning surface or the surface of the fiber or connector, and clean all these constituents, without the use of chemicals, solvents, or complex systems or procedures.

The present inventors have learned that polishing the connectors themselves during the manufacturing process, that a "planetary motion" around the connector endface is far superior to a linear motion across the ferrule and fiber endface. Earlier patents describe the method and benefits of the planetary motion in the polishing of ferrule and fiber end faces. For example, U.S. Pat. No. 5,463,709 and U.S. Pat. No. 5,559,916 both describe a method for planetary polishing motion and highlight the basis for superior polishing of the fiber/ferrule endface geometry. The present inventors have found that planetary motion polishing provides a superior method for controlling endface geometry, limiting scratches, preserving the fiber micro-geometry, and generally producing an endface that is substantially scratch-free and clean. Recent testing by the present inventors has confirmed that the use of a planetary motion provides similar benefits also true in the case of connector cleaning.

Connector cleaners have been traditionally designed such that the cleaning motion is linear along a single axis. Examples of single-axis linear motion connector cleaners include the CLETOP® reel cleaner from NTT-ME Corporation (U.S. Pat. No. 5,117,528), the OPTIPOP R reel cleaner from NTT Advanced Technology Corporation, the OPTIPOP C card cleaner also from NTT Advanced Technology Corporation (U.S. Pat. No. 6,681,437), the FiberSwiper® car cleaner from Neptec Optical Solutions, Incorporated, and others. Testing within the fiber optic has found these tools and methods wanting with regard to industry standards, such as Telcordia GR 2923-CORE. Most of these were developed before the advent, in the late 1990s, of the Small Form Factor (SFF) connector, such as the MU or LC fiber optic connectors licensed by NTT Advanced Technology Corporation and Lucent respectively, and do not address the cleaning needs of this now very popular connector.

One of the challenges in using a cleaner with single-axis linear slots is that they require the hand to impart a twisting motion on the connector as the connector is dragged along the slot. Maintaining a uniform twisting motion while linearly sliding the connector within the slot is difficult and not completing a twisting motion during the entire travel down the slot generally results in an inferior cleaning action. Traditional slot based cleaners do not provide for nor allow a circular or planetary motion other than this twisting. The product literature and use instructions very clearly instruct as to the importance of this awkward twisting motion. The traditional slit geometry, seen in the OPTIPOP C, the OPTIPOP R, the CLETOP®, and the FiberSwiper®, does not allow a planetary or angular motion and thereby suffers a significant shortcoming in this regard.

Another challenge in using SFF connectors with single axis linear slot connector cleaners is that as the operator attempts to use a twisting motion, the front edge of the connector, which is generally sharp, often digs into the fabric. When digging into the fabric, the connector tears fibers, creates contamination, and raises the connector endface so that cleaning is not only insufficiently accomplished, but may result in further contamination of the endface.

BRIEF SUMMARY OF THE INVENTION

An optical connector cleaner adapted to facilitate the use of planetary motions is shown and described herein. The optical connector cleaner includes a nonlinear path along which an optical connector is moved. By following the nonlinear path, the optical connector is subjected to planetary motion without requiring the operator to twist the connector by hand. The use of planetary motion improves the efficiency and quality of the cleaning operation. In addition, the optical connector cleaner of the present invention provides improved resistance to damage from the ferrule edge during cleaning.

The optical connector cleaner uses a card-type form factor having a plurality on nonlinear slots. Moving an optical connector along the path of one of the nonlinear slots cleans the optical connector endface. The optical connector cleaner includes at least four layers secured together. A base layer defines a plurality of recesses each corresponding to a cleaning location. Secured to the base layer is a cleaning layer, typically fabric or paper. A guide layer defining a series of guide windows overlies the cleaning layer. The guide windows correspond in number with and align with the recesses of the base layer. Finally, a protective layer removably adheres to the guide layer and protects the portions of the cleaning layer exposed by the guide windows until use.

By changing the traditional direction and shape of the cleaning motion and path from a straight line to a nonlinear path, the operator is forced to impart planetary motion, or series of partial planetary motions, on the optical fiber connector when cleaning. Various nonlinear, angular, circular, semi-circular, spiral, wavy, and other nonlinear geometries can be used to achieve the present invention.

By suspending the cleaning layer over the recesses of the base layer, a drum-head structure is formed. The drum-head structure produces a strength enhancement that reduces or eliminates damage to the texture of the cleaning layer with regard to cleaning properties and performance. Further, due to the drum-head structure, any damage is unlikely to contaminate the connector allowing the optical connector cleaner of the present invention to fully and completely meet the requirements of Telcordia GR-2923-CORE. The drum-head structure allows the cleaning layer to withstand the pressures imparted when cleaning a small form factor connector.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An optical connector cleaner adapted to facilitate the use of planetary motions is shown at 100 in the figures and described herein. The optical connector cleaner includes a nonlinear path along which an optical connector is moved. By following the nonlinear path, the optical connector is subjected to planetary motion without requiring the operator to twist the connector by hand. The use of planetary motion improves the efficiency and quality of the cleaning operation. In addition, the optical connector cleaner of the present invention provides improved resistance to damage from the ferrule edge during cleaning.

Figure 1:
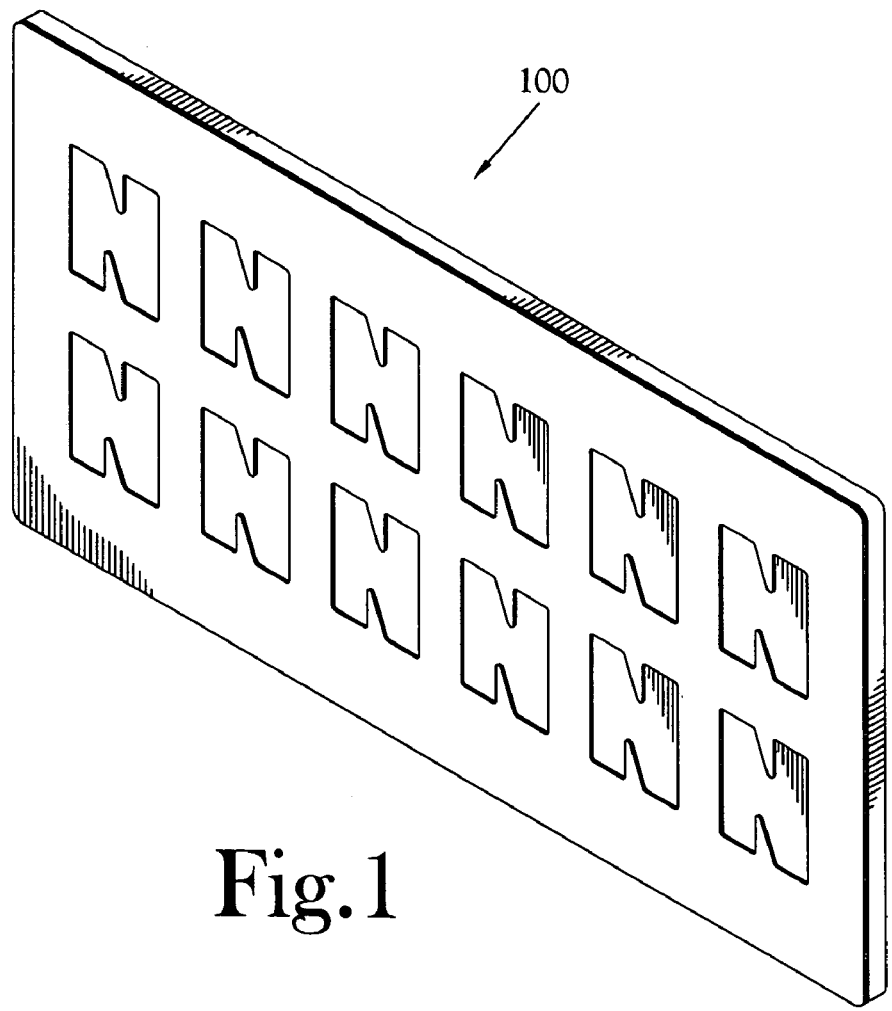
FIG. 1 illustrates a perspective view of the optical connector cleaner of the present invention.

FIG. 1 illustrates one embodiment of the optical connector cleaner 100 of the present invention. The optical connector cleaner 100 uses a card-type form factor that includes a plurality of nonlinear slots. Moving an optical connector along the path of one of the nonlinear slots cleans the optical connector endface.

Figure 2:
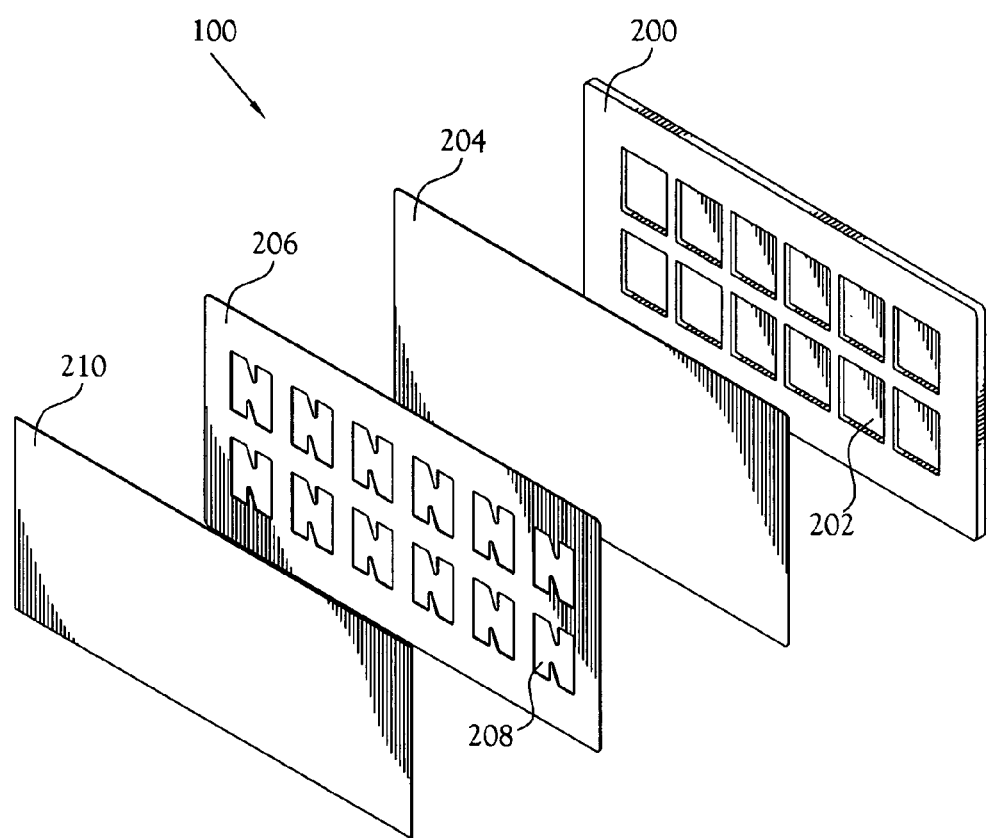
FIG. 2 illustrates an exploded perspective view of one embodiment the optical connector cleaner of the present invention.

FIG. 2 illustrates an exploded view of the optical connector cleaner 100. The optical connector cleaner 100 includes at least four layers secured together. The illustrated embodiment of the optical connector cleaner 100 has a base layer 200. The base layer 200 defines a plurality of recesses 202 each corresponding to a cleaning location. In one embodiment, the base member 200 is molded or cut from a single piece of material. Secured to the base member is a cleaning layer 204, typically fabric or paper. A guide layer 206 defining a series of guide windows 208 overlies the cleaning layer 204. The guide windows 208 correspond in number and align with the recesses 202 of the base layer 200. Finally, a protective layer 210 removably adheres to the guide layer 206 and keeps the portions of the cleaning layer 204 exposed by the guide windows 208 clean and uncontaminated until use.

The protective layer 210 is fabricated from plastic, paper, metal foil, or other suitable protective material. Further, sectioning the protective layer 210 into a number of areas corresponding to the number of guide windows 208 allows a portion of the protective layer 210 to be individually removed from a selected guide window 208 while leaving all others covered. Those skilled in the art will recognize other types and configurations of protective layers or other ways to protect the cleaning layer without departing from the scope and spirit of the present invention.

Figure 3:
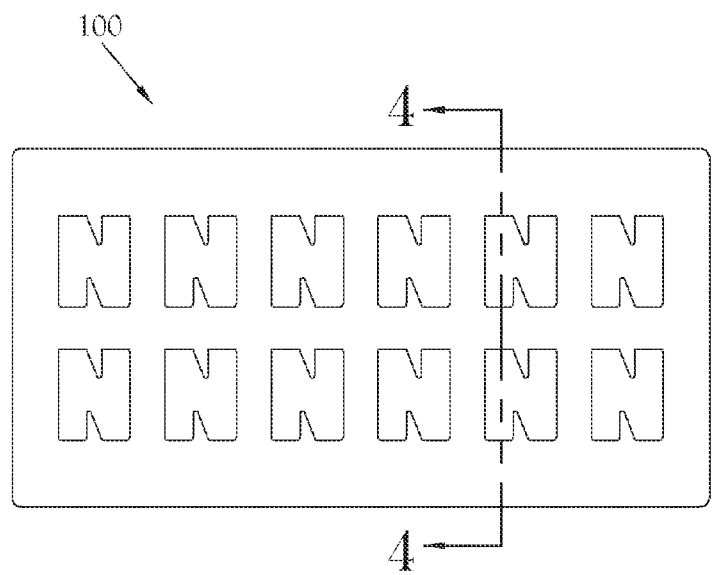
FIG. 3 illustrates a top plan view of the optical connector cleaner of the present invention.

FIG. 3 shows a top plan view of the optical connector cleaner 100. In the illustrated embodiment, the guide windows 208 have the shape of a capital letter N. By changing the traditional direction and shape of the cleaning motion and path from a straight line to a planetary motion, or series of partial planetary motions, created by a continuous or several changes in direction following angles, circles, or waves in the cleaning path, causing us to create a cleaner with turns, angles, and wave shapes instead of straight lines, slits, or slots. The planetary motion in a circular or multiple angles pattern allows the operator to hold the connector in a fixed position and move the connector around the circle or angles to achieve the desired circular or planetary effect. Further, the optical connector cleaner card 100 of the present invention offers the ability to use guide window shapes that have longer travel paths without significantly altering the size and geometry of the optical connector cleaning card 100 when compared to traditional straight-line slot cleaner cards. For example, consider a prior-art optical connector cleaner card that contains twelve 25 millimeter slots and an optical connector cleaner according to the present invention having 12 circular guide windows, each with a diameter of 12 millimeter. Both cards are constructed with similar sizes and geometries; however, the length of travel around the circumference of circular guide window with a 12 millimeter diameter is approximately 37.68 millimeter, just over 50% longer than the travel distance provided by the 25 millimeter slot.

Figure 4:
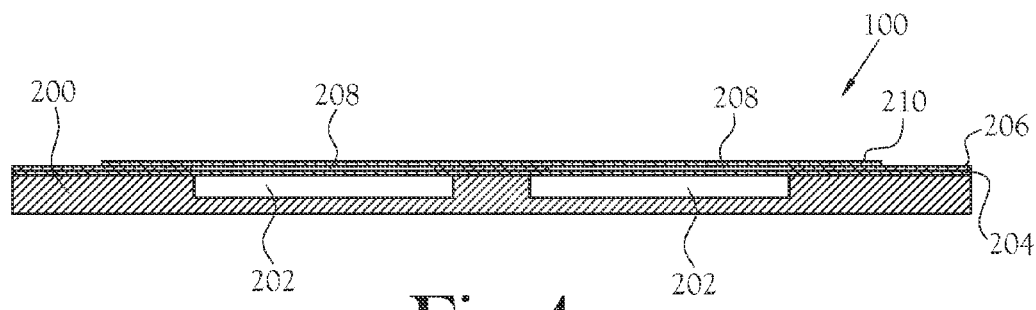
FIG. 4 illustrates a right side elevation cross-section of one embodiment of the optical connector cleaner of the present invention, taken along line 4—4.

FIG. 4 illustrates a cross section of FIG. 3 taken along the line 4—4. Evident from this view is the drum-head structure created by the recesses 202. The depth of the recesses is selected such that fabric of the cleaning layer 204 remains suspended and does not "bottom out" against the base layer 200 under the gentle pressures normally used in the cleaning process.

The structure shown in FIG. 4 is the result of a search for a strength enhancing structure undertaken by the present inventors. Over the course of more than one year, various structures were evaluated and the only successful manner of strength enhancement found by the present inventors was the creation of a "drum-head" by the cleaning layer 204 and the base layer 200. In the drum-head arrangement, the cleaning layer 204, especially in the case of SFF connectors, is suspended above the base layer 200 under each guide window 208. Using this structure, the simple N-shape pattern of the guide windows 208 in the illustrated embodiments successfully cleaned both the 2.5 and 1.25 millimeter ferrule endface with these simple instructions: "Holding the connector as if it were a pen, clean the connector by following the 'N' shape pattern. For best results, tilt the connector at a slight angle away from the direction of travel. Include a twisting motion while traveling from points B to C. Use each 'N' shape one time."

Based upon the evaluations, the present inventors have determined that the drum-head structure visible in FIG. 4 produces a strength enhancement that reduces or eliminates damage to the texture of the cleaning layer 204 with regard to cleaning properties and performance. Further, due to the drum-head structure, any damage is unlikely to contaminate the connector allowing the optical connector cleaner of the present invention to fully and completely meet the requirements of Telcordia GR-2923-CORE.

During the search, the present inventors also evaluated over 100 different fabrics, papers, and materials to serve as the cleaning layer 204; however, the present inventors were unable to identify any materials which could successfully clean the 1.25 millimeter ferrule endface without the drum-head structure. When used with the drum-head structure, the cleaning layer is fabricated from a material known in the art to be suitable for cleaning optical components, including woven cloth, paper, and non-woven fabrics.

Figure 5:
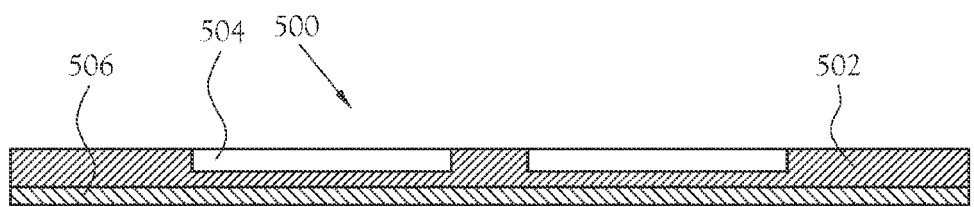
FIG. 5 illustrates a right side elevation cross-section of an alternate embodiment of the optical connector cleaner of the present invention, taken along line 4—4.

FIG. 5 shows a cross section, also taken along line 4—4 of FIG. 3, of an alternate embodiment of a base layer 500 constructed in two pieces. The first piece is a spacer 502 defining a plurality of through openings 504. The second piece is a backing 506 secured to the spacer.

The purpose of the recesses 202 in the one-piece base layer 200 and the enclosed through openings 504 in the two-piece base layer 500 is to create space under the fabric of the cleaning layer. The fabric of the cleaning layer is bonded to the top surface of the base layer 200, 500 and the bottom surface of the guide layer 206. This arrangement assures that the cleaning layer 204 is well bonded around the perimeter of each guide window 208 of the guide layer 206 and suspended such that the fabric of the cleaning layer 204 does not "bottom out" against the base layer 200 or tear or break.

The embodiment of the base layer 500 in FIG. 5 is functionally equivalent to the one-piece base layer 200. Generally, the distinction between the two-piece base layer 500 and the one-piece base layer 200 lies in the manner of construction. The one-piece base layer 200 is generally constructed through molding or similar techniques to create a base layer 200 having the desired open areas, i.e., the recesses 202. The one-piece base layer 200 can be constructed of materials suited for molding, such as various polymers and plastics exhibiting the desired rigidity and other characteristics. Conversely, the two-piece base layer 500 is suited for construction using stamping, punching, or other similar techniques where material is punched, cut, or otherwise removed from a piece of material. Attaching the backing 506 to the spacer 502 encloses the through openings on one side to create the drum-like structure and protect the cleaning layer. The two-piece base layer 500 can be constructed of materials suited for punching, such as cardboard, paperboard, and various plastics exhibiting the desired rigidity and other characteristics.

By moving the connector along the path of the guide window 208, the operator effectively cleans the connector endface using a planetary, or angled path, motion. Because moving the connector endface along the path of the guide window 208 does not require a separate twisting motion (although one can be used), a natural planetary cleaning motion is achieved without scraping the edge of the ferrule against the cleaning layer 204.

Figure 6:
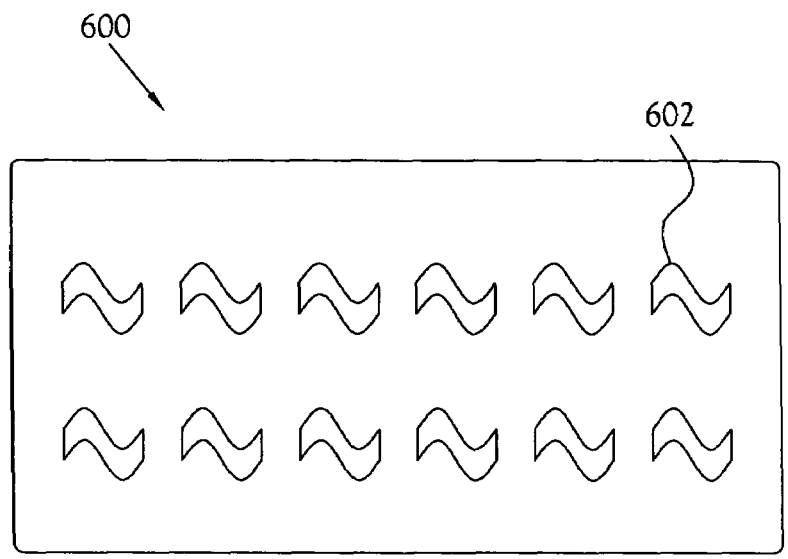
FIG. 6 illustrates a top plan view of an alternate embodiment of the optical connector cleaner of the present invention showing wavy guide windows.
Figure 7:
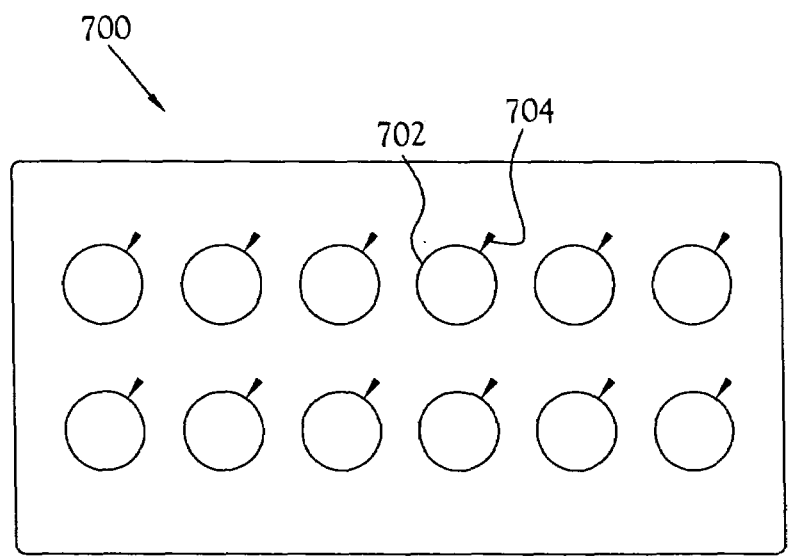
FIG. 7 illustrates a top plan view of an alternate embodiment of the optical connector cleaner of the present invention showing circular guide windows.

The use of N-shaped guide windows as depicted in FIGS. 1–5 is not intended to limit the disclosure of the guide window shape. Those skilled in the art will recognize that other nonlinear, angular, multi-angular, circular, semi-circular, spiral, wavy, and other nonlinear geometries can be used for the guide windows without departing from the scope and spirit of the present invention. FIGS. 6 and 7 illustrate alternate embodiments of the optical connector cleaner card. Generally, the guide windows present a nonlinear path which can be traversed without lifting the connector from the cleaning layer or crossing a previously used section of the cleaning layer. The total area occupied by the window, the number of angles, the arc, and the length of the travel path are factors to consider when selecting a guide window shape. For example, other characters from existing alphabets and number systems could be used without departing from the scope and spirit of the present invention. FIG. 6 illustrates an optical connector cleaner card 600 incorporating a wavy guide window 602.

FIG. 7 illustrates an optical connector cleaner card 700 incorporating a circular guide window 702. The use of non-directional and endless geometries for the guide window presents the risk that the operator will traverse the same section of the cleaning layer 204 more than once. Reuse of the same section of the cleaning layer has the potential to again contaminate the optical connector with the substances removed during the previous pass. Accordingly, it is useful with such geometries to include indicia (one or more indexes) on the guide layer to indicate a starting/stopping point for the travel of optical connector. For example, by placing a mark 704 on the perimeter of the circle, the operator has a reference point useful in controlling the start and finish of the circular cleaning motion.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for cleaning optical fiber connectors, said apparatus comprising:
   a base layer defining a plurality of recesses;
   a cleaning layer affixed to said base layer, said cleaning layer suspended above said recesses to provide a plurality of drum-head structures such that said cleaning layer can deform in response to pressure applied by an optical fiber connector;
   a guide layer affixed to said cleaning layer, said guide layer defining a plurality of guide windows, said plurality of guide windows corresponding in number and position to said recesses defined by said base layer, each of said plurality of guide windows defining a nonlinear path that forces at least one planetary motion to be applied to the optical fiber connector when traveling along said nonlinear path; and
   a protective layer removably affixed to said guide layer, said protective layer being sectioned into a number of areas corresponding to the number of guide windows, each section of said protective layer being individually removable to expose a single one of said plurality of guide windows.

2. The apparatus of claim 1 wherein said base layer includes
   a backing; and
   a spacer affixed to said backing, said spacer defining a plurality of through openings, said through openings being closed at one end by said backing whereby said plurality of recesses are formed.

3. The apparatus of claim 1 wherein each of said plurality of guide windows are shaped like a capital letter N.

4. The apparatus of claim 1 wherein each of said plurality of guide windows have a shape selected from the group consisting of multi-angular shapes, circles, semicircles, spirals, and waves.

5. The apparatus of claim 1 wherein each of said plurality of guide windows are circular, said plurality of guide windows further comprising at least one index on the perimeter of each said guide window, whereby an operator has a reference point to begin and end movement of the optical fiber connector allowing the operator to avoid moving the optical connector over a previously traversed area of said cleaning layer.

6. An apparatus for cleaning optical fiber connectors, said apparatus comprising:
   a base layer;
   a cleaning layer affixed to said base layer;
   a guide layer affixed to said cleaning layer, said guide layer defining a plurality of guide windows, each of said plurality of guide windows defining a nonlinear path that forces at least one planetary motion to be applied to the optical fiber connector when traveling along said nonlinear path; and
   a protective layer disposed over said guide layer, said protective layer being adapted to protect the cleaning layer exposed by of said plurality of guide windows until use, wherein said protective layer is removably affixed to said guide layer, said protective layer being sectioned into a number of areas corresponding to the number of guide windows, each section of said protective layer being individually removable to expose a single one of said plurality of guide windows.

* * * * *